N. Seitz
Grain Ventilator,
Nº 24,407. Patented June 14, 1859.
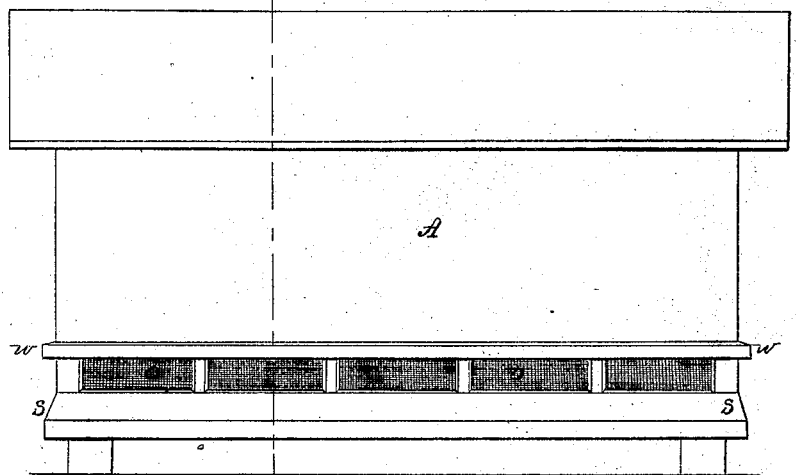
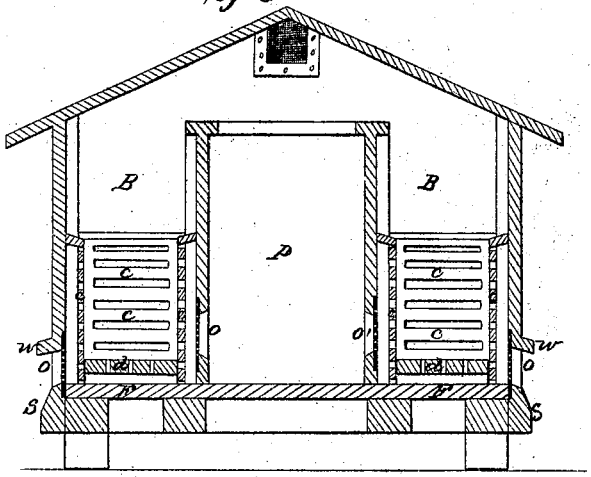
Witnesses
Geo Patten
W. H. Douey.
Inventor
Noah Seitz

UNITED STATES PATENT OFFICE.

NOAH SEITZ, OF MELLMORE, OHIO.

METHOD OF VENTILATING CORN-HOUSES.

Specification of Letters Patent No. 24,407, dated June 14, 1859.

*To all whom it may concern:*

Be it known that I, NOAH SEITZ, of Mellmore, in the county of Seneca and State of Ohio, have invented a new and useful Improvement in Construction of Corn-Houses; and I do hereby declare that the following is a full, clear, and exact description of the same, reference being had to the annexed drawing, forming part of this specification, in the several figures of which similar characters of reference denote the same part.

Figure 1 is a side elevation of the corn house. Fig. 2 is vertical, transverse section on line $x$, $x$.

The nature of my invention consists in a certain combination of devices whereby a free passage of air through the body of corn is obtained and rats and other vermin are excluded, the arrangement is as follows. There is an open space between the sill of the house, and the water table, to allow the air to pass under, into the crib, this opening being protected by a wire gauze grating, so as to exclude rats from the house, which extends above the water table, and down between the sill and the outside facing; this facing is beveled so as to direct any current of air into the opening. There is also a secondary perforated floor above the lower floor, and a lathing against the studs on the sides and ends of the crib, another open space into the passage way between the cribs, protected by wire grating, and ventilators at the top, at each end, to allow the air to pass out after having gone through the crib.

In the drawing A is corn house; B the cribs; P the passage way between them; O the open space between the sill and water table; O′ the opening from the cribs into the passage P; F the lower floor, $d$ the secondary perforated floor.

$c$ is the lathing on the sides and ends of the cribs, and $f$ the ventilator at the top of the house; W is the water table, and S the sill. So that the air going into the opening O, on the outside, and O′ in the passage way P, passes through the perforations in the secondary floor $d$, into the corn, also into the space between the sides of the crib and the lathing, through the latter into the body of the corn, and passes out through the ventilator $f$, at the top, thus giving a free circulation of air through the whole body of corn and by means of the wire grating excluding all rats and other vermin from the cribs.

I make no claim to wire gauze grating in ventilating buildings as shown in *Morton's Cyclopedia of Agriculture* vol. 1 page 811. But

I claim—

The arrangement of the openings O, and O′, with the wire grating in combination with the secondary perforated floor $d$, lathing $c$, and ventilators $f$, substantially as and for the purposes set forth.

In testimony whereof I have hereunto signed my name before two subscribing witnesses.

NOAH SEITZ.

Witnesses:
GEO. PATTEN,
JOHN HOLLINGSHEAD.